(12) United States Patent
Zhang et al.

(10) Patent No.: US 11,457,755 B2
(45) Date of Patent: Oct. 4, 2022

(54) TEAPOT

(71) Applicant: Shenzhen Buydeem Technology Co., Shenzhen (CN)

(72) Inventors: George Mohan Zhang, Shenzhen (CN); Pengrui Zhong, Shenzhen (CN); Shubin Zou, Shenzhen (CN); Haixin Wu, Shenzhen (CN); Chenfa Kang, Shenzhen (CN)

(73) Assignee: Shenzhen Buydeem Technology Co., Shenzhen (CN)

( * ) Notice: Subject to any disclaimer, the term of this patent is extended or adjusted under 35 U.S.C. 154(b) by 0 days.

(21) Appl. No.: 17/401,393

(22) Filed: Aug. 13, 2021

(65) Prior Publication Data

US 2022/0095817 A1    Mar. 31, 2022

(30) Foreign Application Priority Data

Aug. 21, 2020 (CN) .......................... 202010849123.8

(51) Int. Cl.
*A47G 19/14* (2006.01)
*A47J 31/20* (2006.01)

(52) U.S. Cl.
CPC .............. *A47G 19/14* (2013.01); *A47J 31/20* (2013.01)

(58) Field of Classification Search
CPC ....... A47G 19/14; A47J 31/20; A47J 31/0615; A47J 31/0636; A47J 31/0626
See application file for complete search history.

(56) References Cited

U.S. PATENT DOCUMENTS

| 4,361,257 A * | 11/1982 | Stone, Jr. ............... | A47G 19/14 99/275 |
| 4,714,180 A * | 12/1987 | Stone, Jr. ............... | A47G 19/14 220/228 |
| 2014/0013959 A1 * | 1/2014 | Fujii ................... | A47J 31/0636 99/323 |

* cited by examiner

*Primary Examiner* — Donnell A Long
(74) *Attorney, Agent, or Firm* — PROI Intellectual Property US; Klaus Michael Schmid

(57) ABSTRACT

A teapot is provided with a pot body, a tea leaf filter basket in the pot body, and a lid on the pot body. A tea leaf filter basket bracket is sleeved at a pot opening of the pot body on an outer edge of the tea leaf filter basket; the tea leaf filter basket bracket and an inner side surface of the pot opening of the pot body are in interference fit; and the tea leaf filter basket bracket is in pivoted connection with the lid. The tea leaf filter basket is placed on the tea leaf filter basket bracket.

7 Claims, 9 Drawing Sheets

US 11,457,755 B2

TEAPOT

TECHNICAL FIELD

The present disclosure relates to a tea set, in particularly, a container for making tea.

BACKGROUND

With the increase of people's health awareness and tea tasting, higher requirements are placed on a material of a tea container. Since a glass is made of an inorganic material, a glass tea container will not produce other substances when heated close to 100° C. On the contrary, as for a plastic container, a water temperature is close to 100° C. for tea making, which is relatively high, so that volatile plastic may produce pungent smell after being heated. The tea that is made is mixed with other taste, and the taste of the tea is spoiled. Furthermore, there is adverse effect on people's health. The glass tea container has been favored by consumers due to good transparency and visibility of glass, and has become the mainstream in the market. Most of teacups and teapots in the prior art are single-cavity cups. During tea making, tea leaves are directly put into a teapot for brewing with boiled water. When drinking, the process of adding or pouring out tea leaves is relatively complicated, and the tea leaves and water are easy to pour out together, resulting in impure tea with tea leaves, which affects the user experience and the taste. A tea leaf filter basket or a filter cup is also provided in the cup to form a structure with an outer cup and an inner cup. However, the inner and outer cups of this teacup are loosely connected and low in stability. During withdrawal, the tea leaf filter net easily makes collision sound with the glass outer cup. Furthermore, most teapots need to be placed on a tabletop after a lid is opened for adding water or tea leaves; the tea or condensed water left on the lid will wet the tabletop, which is not sanitary; and it is also easy for a person to touch the cup body and scalded when opening the lit.

SUMMARY

The present disclosure is directed to provide a teapot to solve the technical problems to achieve that tea making is clean and sanitary and convenience in use.

The present disclosure uses the following technical solution. A teapot is provided with a pot body, a tea leaf filter basket in the pot body, and a lid on the pot body. A tea leaf filter basket bracket is sleeved at a pot opening of the pot body on an outer edge of the tea leaf filter basket; the tea leaf filter basket bracket and an inner side surface of the pot opening of the pot body are in interference fit; and the tea leaf filter basket bracket is in pivoted connection with the lid.

The tea leaf filter basket bracket of the present disclosure is a cylinder with opening in two ends. The upper end part of the tea leaf filter basket bracket is outwards flipped 90 degrees to form a circular large saddle; and the lower end part of the tea leaf filter basket bracket is outwards flipped 90 degrees to form a circular small boss. The large saddle, the cylinder of the tea leaf filter basket bracket, and the small boss form one circle of groove. The groove is internally sleeved with a silicone rubber ring; and the silicone rubber ring is in interference fit with the inner side surface of the pot opening of the pot body.

One end of a circumferential edge of the large saddle of the present disclosure extends to the outside to form a first connection lug that is of an opened ring shape.

The lid of the present disclosure is a circular flat plate. A lower end surface of the circular flat plate is provided with a circular-ring-type quick steam condensation ring; a circle center of the quick steam condensation ring and a circle center of the lid are concentric; a circumference of the circular flat plate of the lid extends to the outside in a radial direction to form a strip-type lid opening pressing plate; and the edge of a side of a circular ring of the quick steam condensation ring close to the lid opening pressing plate is the highest, and is symmetrically gradually lowered towards two sides till a side opposite to the lid opening pressing plate is the lowest, so that the quick steam condensation ring is formed into a bevel edge circular ring.

A connection position of the lid of the present disclosure and the lid opening pressing plate is provided with a second connection lug. The second connection lug is provided with two parallel small plates; the small plates are provided with coaxial through holes; the first connection lug is arranged between the two small plates to enable the axis of the opened ring to be coaxial with the through holes of the small plates; and a snap-in pillar passes through the opened ring and the through holes of the small plates along the axis to form intermittent fit connection.

The inner side of the opened ring of the first connection lug of the present disclosure is of an arc-shaped structure. Two ends of the upper part of the arc-shaped structure are provided with protruding parts that protrude into the arc; an opening is formed between the protruding parts; and an accommodating space is provided below the opening.

An outer diameter of the snap-in pillar of the present disclosure is greater than a distance between the two protruding parts.

The opened ring of the first connection lug of the present disclosure is an elastic buckle.

Two sides of the opened ring of the first connection lug of the present disclosure close to the protruding parts are provided with outwards convex pins, and the axis of each convex pin is parallel to the axis of the accommodating space.

Pin holes are formed in the small plates of the second connection lug of the present disclosure. When the lid covers the position on the pot opening of the pot body, the convex pins extend into the pin holes.

Compared with the prior art, the teapot of the present disclosure is provided with the tea leaf filter basket, the tea leaf filter basket bracket and the flip lid, and the tea leaf filter basket is placed on the tea leaf filter basket bracket, so that when the tea leaf filter basket is placed, collision between the tea leaf filter basket and the glass pot body is avoided, glass is protected, and the collision sound is reduced. The tea leaf filter basket bracket is provided with the connection lugs pivoted with the lid, so that the lid is fixed on the connection lugs of the tea leaf filter basket bracket in a flip manner to cover the upper end of the tea leaf basket. The structure is simple and practical. The lid is provided with the quick steam condensation ring to reduce backflow of condensed water on the inner wall of the lid; tea leaves can be effectively filtered, and tea water effectively flows out. The teapot is stable in structure, clean, sanitary and convenient to use.

DETAILED DESCRIPTION

Figure 1:
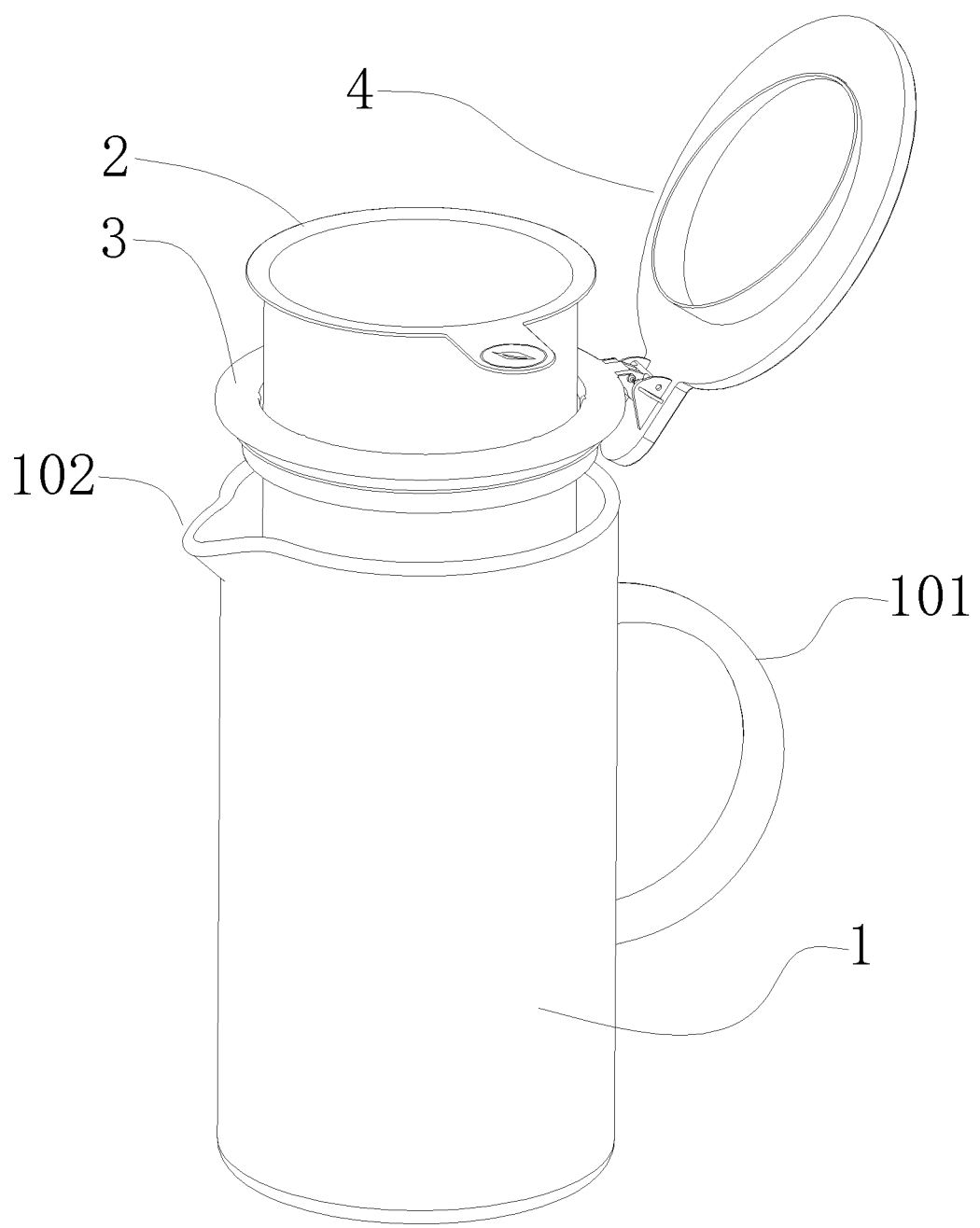
FIG. 1 is a schematic structural diagram illustrating that a lid of the teapot is opened of the present disclosure.
Figure 2:
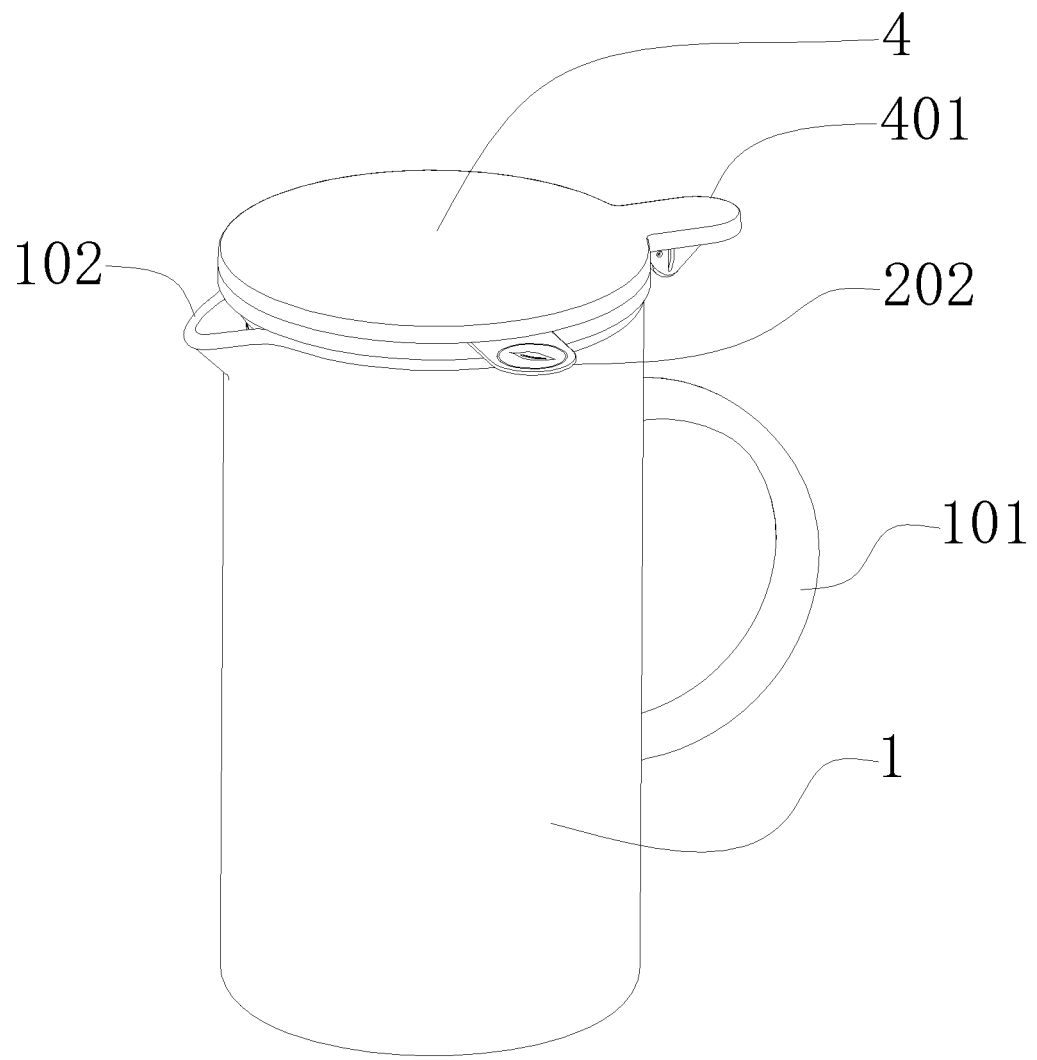
FIG. 2 is a schematic structural diagram illustrating that a lid of the teapot is closed of the present disclosure.
Figure 3:
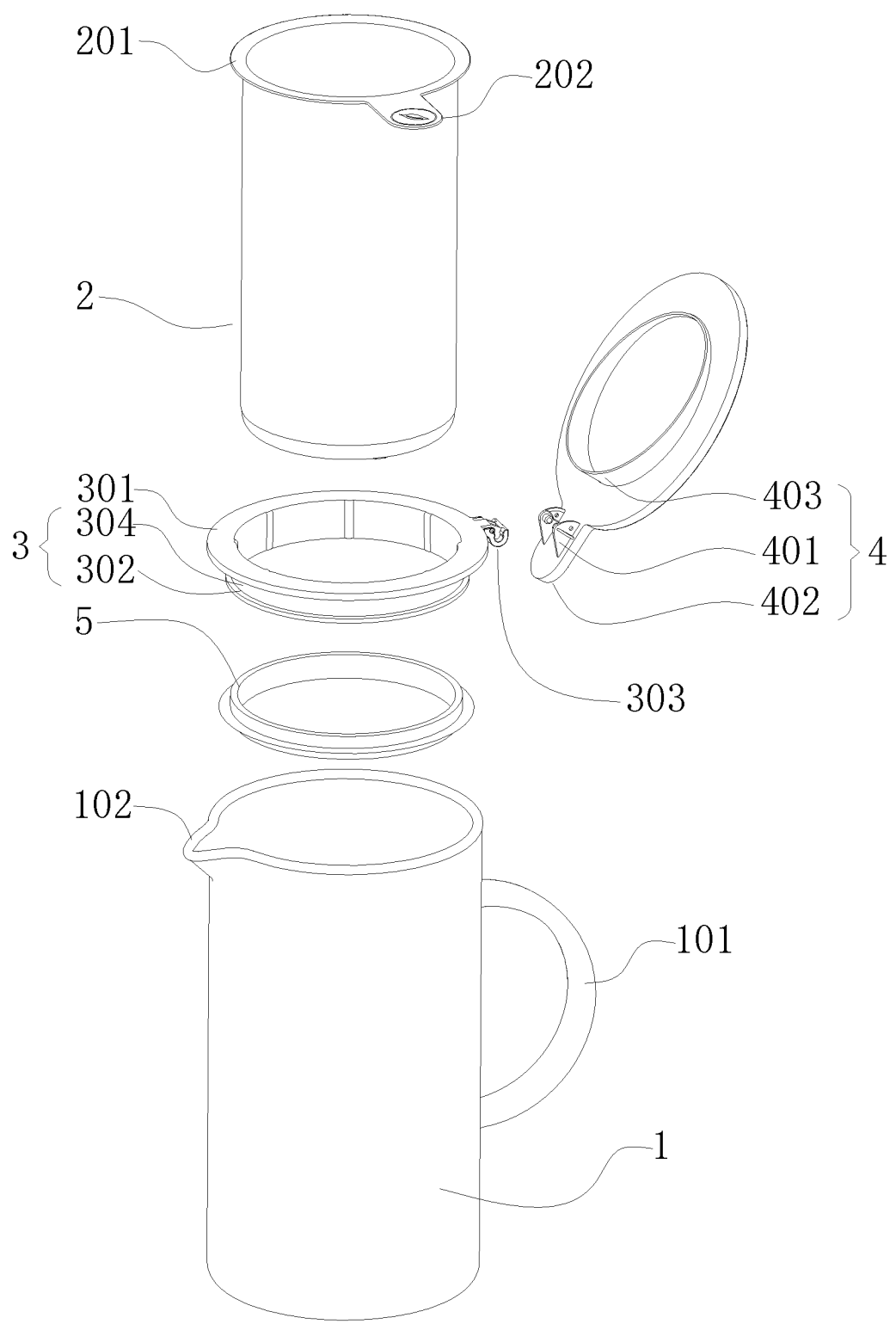
FIG. 3 is a schematic exploded structural diagram of the teapot is opened of the present disclosure.
Figure 4:
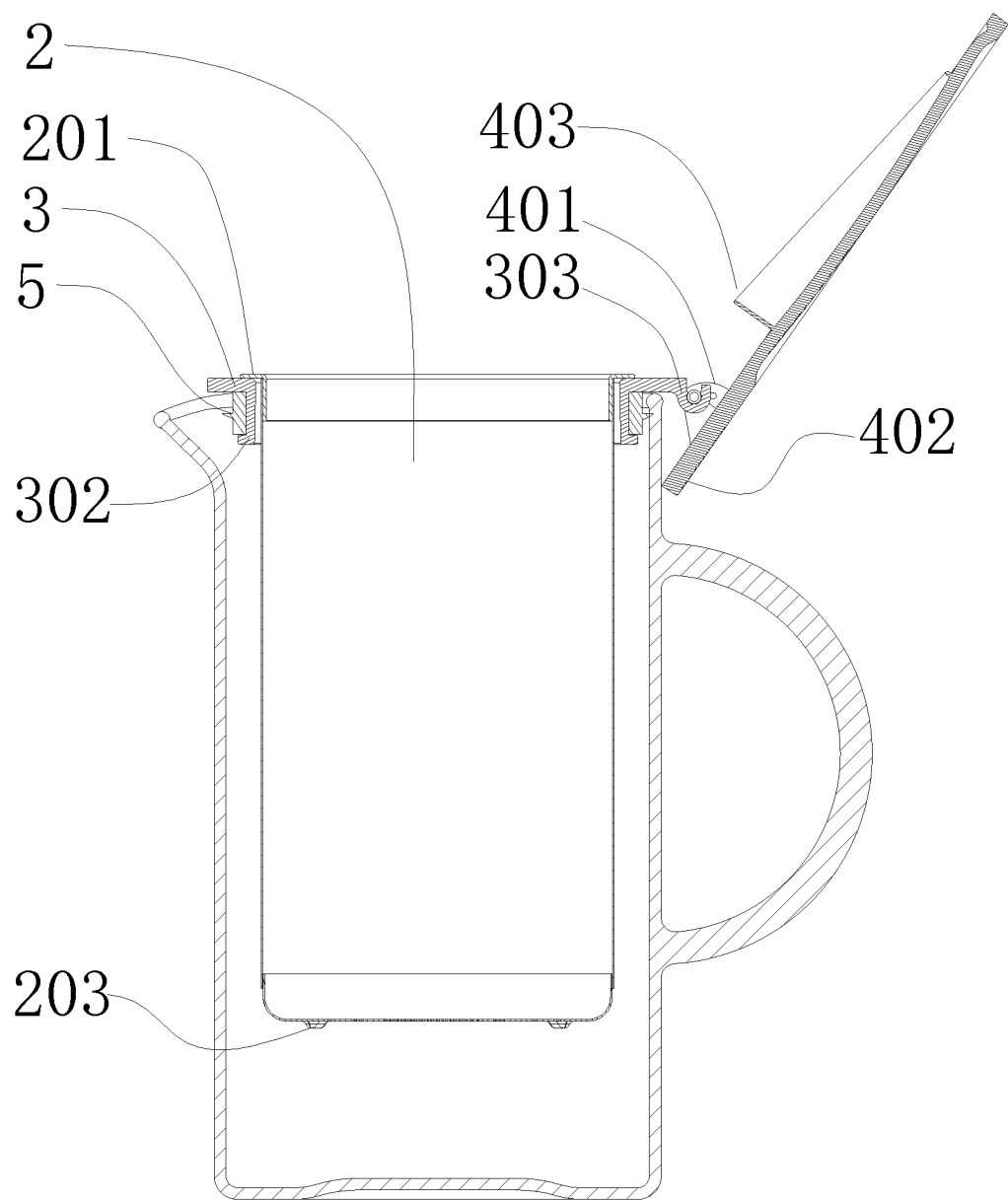
FIG. 4 is a sectional view in an uncovered state of the teapot of the present disclosure.

The present disclosure is further described in detail below in combination with the accompanying drawings and embodiments.

As shown in FIG. 1, FIG. 2, FIG. 3, and FIG. 4, a teapot of the present disclosure is provided with a pot body 1, a tea leaf filter basket 2, a tea leaf filter basket bracket 3, and a lid 4.

The pot body 1 is a cylindrical container. A wall of the cylinder is connected with an arc-shaped handle 101; the upper part of the cylinder is provided with nozzle 102 with a triangular opening; and the container is integrated with the handle 101 and the nozzle 102. The pot body 1 is made of high boron glass or ceramic material.

The tea leaf filter basket 2 is cylindrical, which is arranged in the pot body 1. The upper end is opened, and the lower end is closed. The cylindrical wall and the closed end of the tea leaf filter basket 2 are full of through holes to form a filter net. An upper port of a circumferential wall of the tea leaf filter basket 2 is outwards flipped 90 degrees to form one circle of outer rim 201. A circumference of the outer rim 201 extends to the outer side in a radial direction to form a strip-type shank 202. The closed end of the tea leaf filter basket 2 extends into the pot body 1, and the outer rim 201 is erected above a pot opening of the pot body 1.

The shank 202 on the outer rim 201 of the tea leaf filter basket 2 extends out of the lid 4 by 10 mm or above to facilitate withdrawal of the tea leaf filter basket 2, and it is hard for people to feel hot and get hands wet.

A tea leaf filter basket bracket 3 is sleeved at the pot opening of the pot body 1 on an outer edge of the tea leaf filter basket 2. The tea leaf filter basket bracket 3 is a cylinder with openings in two ends. The upper end part of the tea leaf filter basket bracket is outwards flipped 90 degrees to form a circular large saddle 301; and the lower end part of the tea leaf filter basket bracket 3 is outwards flipped 90 degrees to form a circular small boss 302. The large saddle 301, the cylinder of the tea leaf filter basket bracket 3, and the small boss 302 form one circle of groove 304. The groove 304 is internally sleeved with a silicone rubber ring 5.

After the silicone rubber ring 5 is sleeved on the large saddle 301 and the small boss 302 of the tea leaf filter basket bracket 3, the silicone rubber ring 5 and the inner side surface of the pot opening of the pot body 1 form interference fit. The tea leaf filter basket bracket 3 can be tightly embedded to the pot body 1 by means of the silicone rubber ring 5. When the tea is poured, the tea leaf filter basket 2, the lid 4 and the tea leaf filter basket bracket 3 will not fall off, so that the structure is simple, and removal and cleaning are facilitated.

Figure 5:
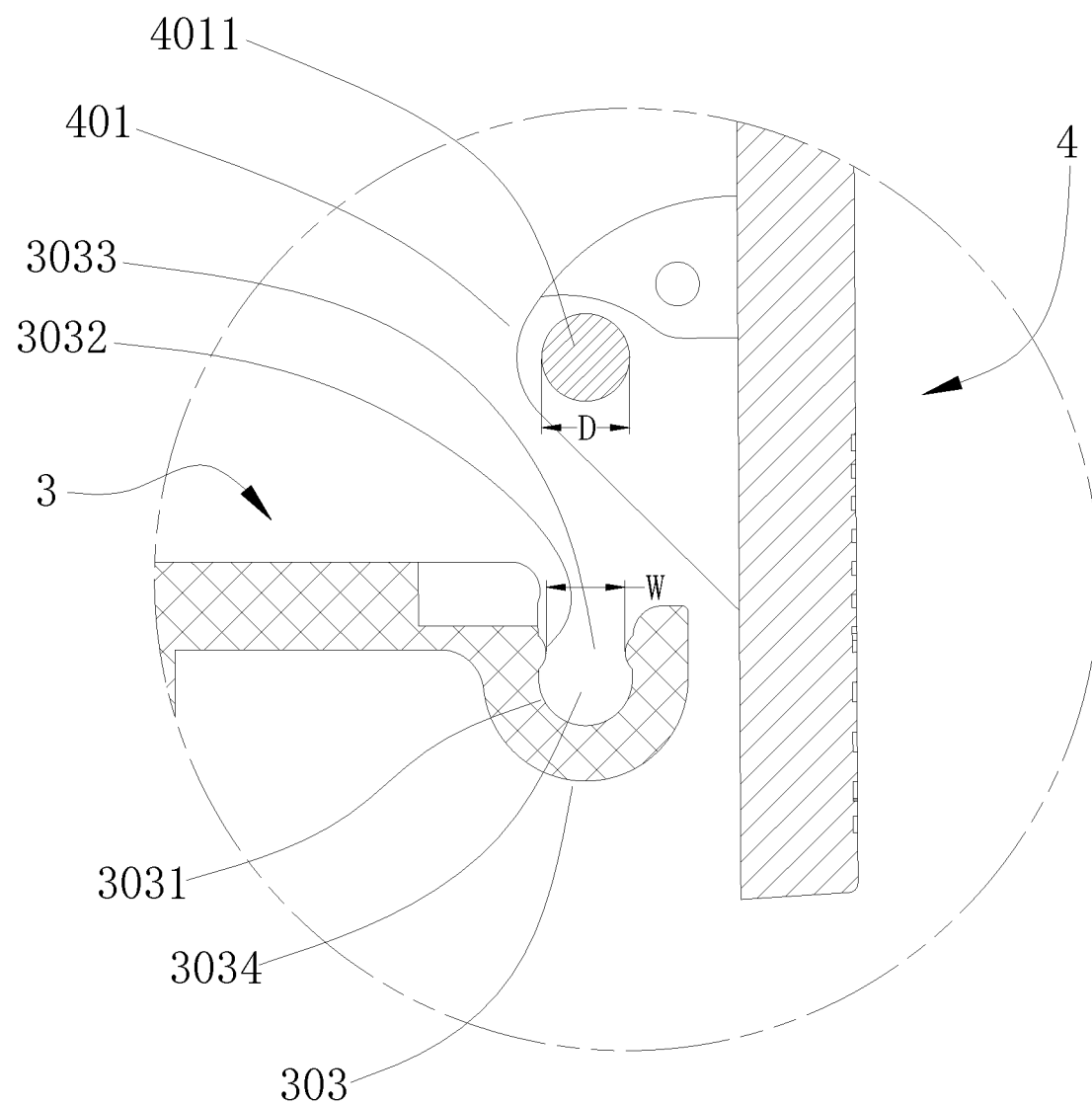
FIG. 5 is a partially enlarged diagram illustrating that a snap-in pillar is not snapped in an opening of the teapot of the present disclosure.

As shown in FIG. 5, one end of a circumferential edge of the large saddle 301 of the tea leaf filter basket bracket 3 outwards extends to form a first connection lug 303 that is of an opened ring shape. A cross section is of a circular hook shape formed by one end of the circumferential edge of the large saddle 301 that extends downward and then upward, with a hook opening upward.

The lid 4 is a circular flat plate. A lower end surface of the circular flat plate is provided with a circular-shape-type quick steam condensation ring 403. A circle center of the quick steam condensation ring 403 and a circle center of the lid 4 are concentric. A circumference of the circular flat plate of the lid 4 extends to the outside in a radial direction to form a strip-type lid opening pressing plate 402; and the edge of a side of a circular ring of the quick steam condensation ring 403 close to the lid opening pressing plate 402 is the highest, and is symmetrically gradually lowered towards two sides till a side opposite to the lid opening pressing plate 402 is the lowest, so that the quick steam condensation ring 403 is formed into a bevel edge circular ring.

The lid 4 is covered above the tea leaf filter basket bracket 3, and the quick steam condensation ring 403 is embedded into the tea leaf filter basket bracket 3.

The function of the quick steam condensation ring 403 is to reduce backflow of condensed water on the inner wall of the lid 4 during lid opening. There may be ¼ to 4 turns of the quick steam condensation ring 403. The quick steam condensation ring 403 may be elliptical or polygonal.

A connection position of the circular flat plate of the lid 4 and the lid opening pressing plate 402 is provided with a second connection lug 401. The second connection lug 401 is provided with two parallel small plates; the small plates are provided with coaxial through holes; the first connection lug 303 is arranged between the two small plates to enable the axis of the opened ring to be coaxial with the through holes of the small plates; and a snap-in pillar 4011 passes through the opened ring and the through holes of the small plates along the axis to form intermittent fit connection to form a pivoted connection structure of the first connection lug 303 and the second connection lug 401.

The lid 4 is covered above the tea leaf filter basket bracket 3, and the second connection lug 401 rotates around the snap-in pillar 4011 to flip up and open or flip down and close the lid 4. The lid 4 is opened without being separated from the tea leaf filter basket bracket 3, which is simple and easy and is convenient to use.

Figure 6:
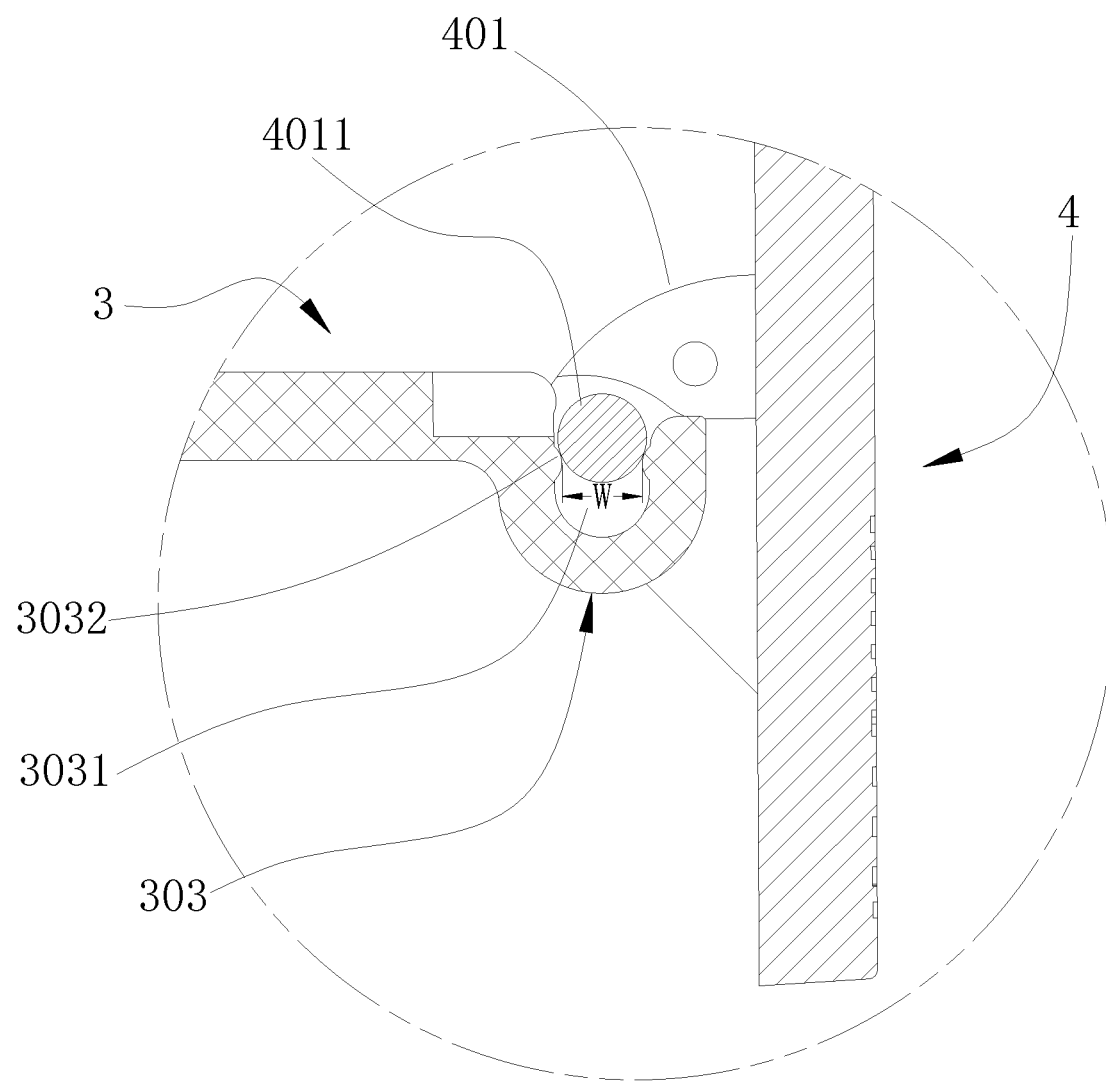
FIG. 6 is a partially enlarged diagram illustrating that the snap-in pillar is snapped in the opening of the teapot of the present disclosure.
Figure 7:
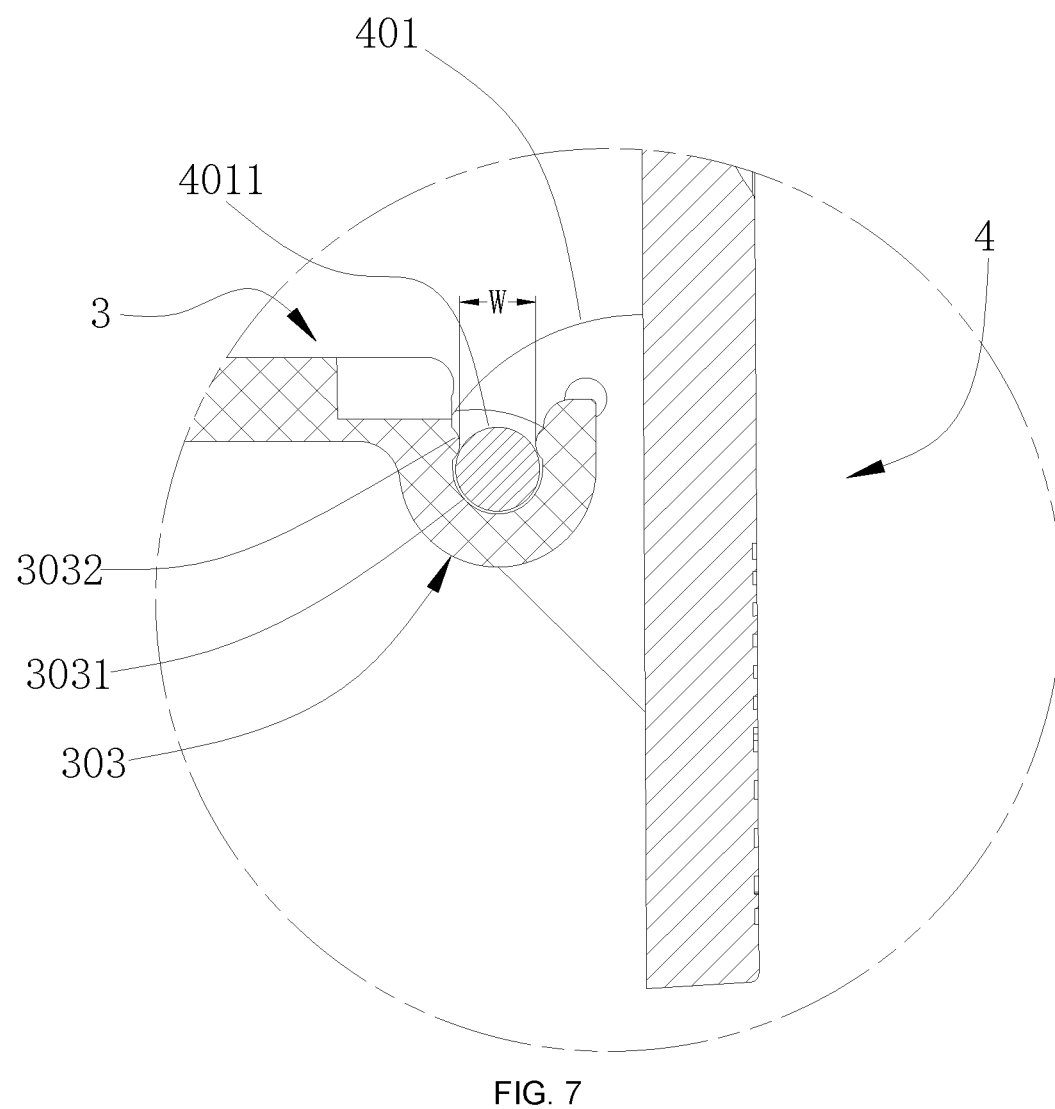
FIG. 7 is a partially enlarged diagram illustrating the width of a bayonet of the teapot of the present disclosure.

As shown in FIG. 5, FIG. 6, and FIG. 7, the inner side of the opened ring of the first connection lug 303 is of an arc-shaped structure 3031. Two ends of the upper part of the arc-shaped structure 3031 are provided with two protruding parts 3032 that protrude into the arc; an opening 3033 is formed between the two protruding parts 3032; and an accommodating space 3034 is provided below the opening.

The shape of the snap-in pillar 4011 that passes through the opened ring of the first connection lug 303 and the through holes of the small plates of the second connection plug 401 is the same as the shape of the accommodating space 3034. The snap-in pillar 4011 is snapped to the accommodating space 3034 via the opening 3033, and the two protruding parts 3032 restricts the snap-in pillar 4011 accommodated in the accommodating space 3034 from moving up and out; and the axis of the snap-in pillar 4011 overlaps the axis of the accommodating space 3034.

An outer diameter D of the snap-in pillar 4011 is greater than a distance W between the two protruding parts 3032, D>W.

The opened ring of the first connection lug 303 is an elastic buckle. The snap-in pillar 4011 is made of a plastic or metal material to facilitate assembling. After the snap-in pillar 4011 is snapped to the accommodating space 3034, the two protruding parts 3032 can effectively fix the snap-in pillar 4011 in the first connection lug 303 without looseness.

Figure 8:
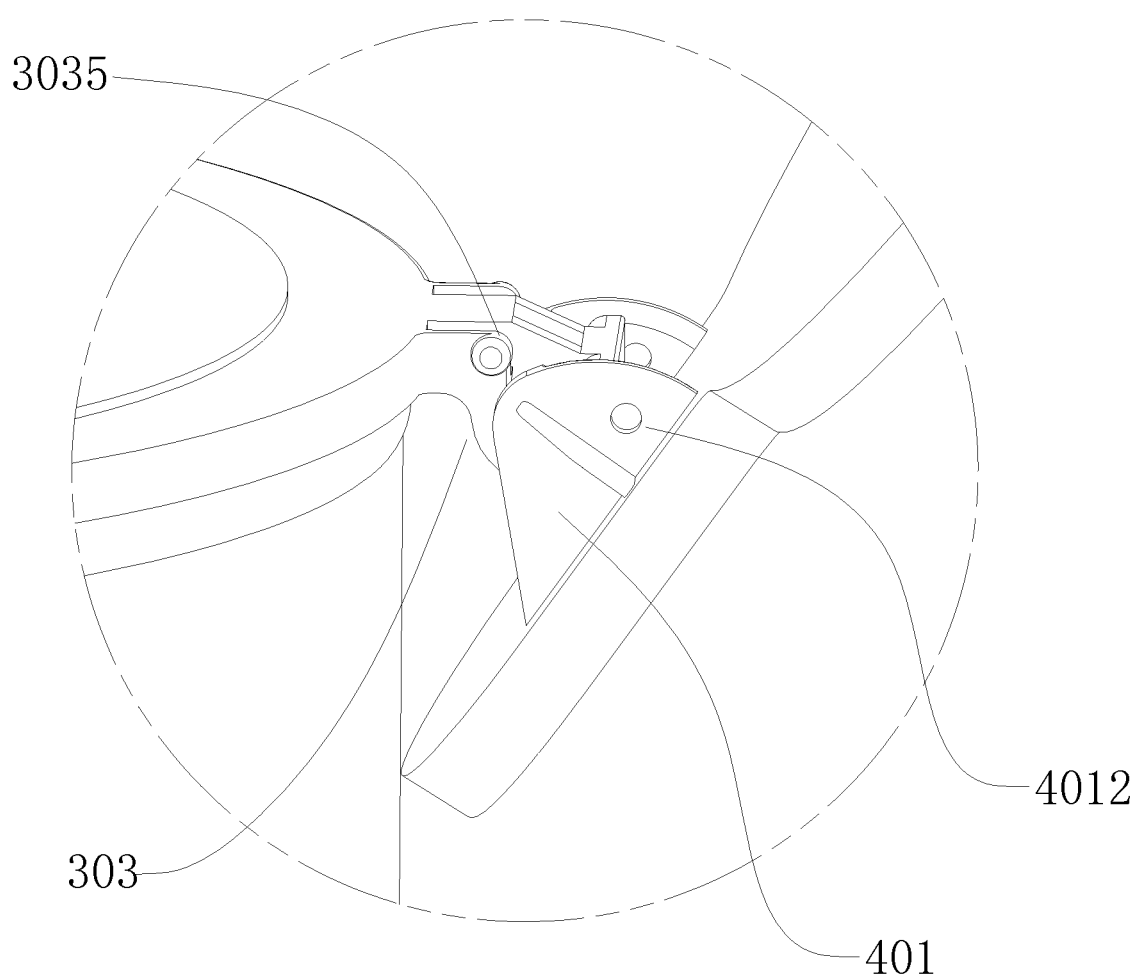
FIG. 8 is a partially enlarged diagram of a convex pin and a pin hole of the teapot of the present disclosure.
Figure 9:
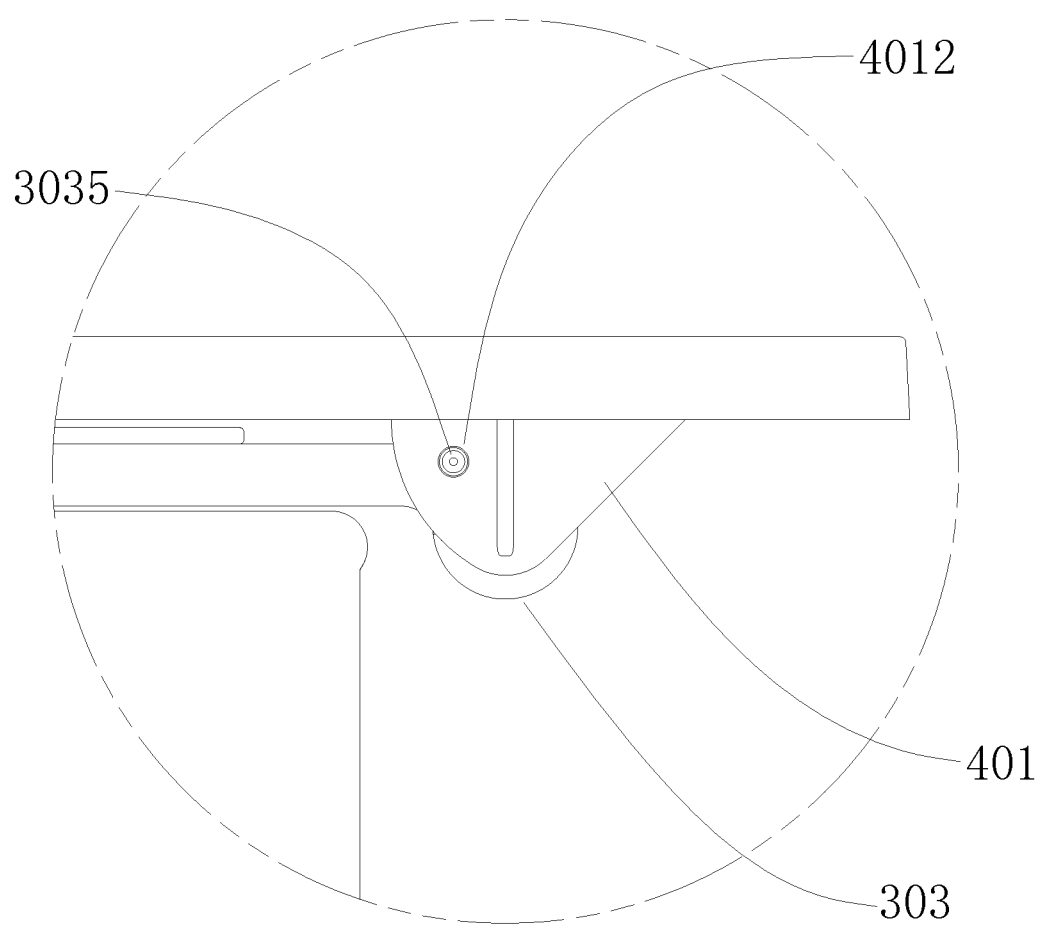
FIG. 9 is a partially enlarged diagram illustrating that a convex pin is snapped in a pin hole of the teapot of the present disclosure.

As shown in FIG. 8 and FIG. 9, two sides of the opened ring of the first connection lug 303 close to the protruding parts 3032 of the large saddle 301 are provided with outwards convex pins 3035, and the axis of each convex pin 3035 is parallel to the axis of the accommodating space 3034. When the lid 4 is covered at a position on the pot opening of the pot body 1, pin holes 4012 are formed in corresponding positions on the small plates of the second connection lug 401. The convex pins 3035 extend into the pin holes 4012, and the lid 4 is located at a locked position. During pouring of the tea, the lid 4 does not need to be pressed with a hand, and the tea leaf filter basket 2 below the lid 4 may not fall off.

When the lid opening pressing plate 402 is pressed, the convex pins 3035 on the first connection lug 303 on the tea leaf filter basket bracket 3 are separated from the pin holes 4012 on the second connection lug 401, and the lid 4 rotates up around the snap-in pillar 4011 and is opened.

The first connection lug 303 connected to the circumference of the large saddle 301 and the lid opening pressing plate 402 are at the same end position. An opening angle of the lid 4 is based on the length of the lid opening pressing plate 402. After the lid is opened, a maximum opening angle is restricted by the outer end part of the lid opening pressing plate 402 that resists against the outer wall of the pot body 1. If the lid opening pressing plate is shorter, the lid opening angle is larger. The lid opening angle of the present embodiment is greater than 90 degrees to facilitate take out the tea leaf filter basket and add water. The structure is simple and practical.

A use process of the teapot of the present disclosure is as follows.

When a user needs to make tea, the user presses the lid opening pressing plate 402 at first to open the lid 4 and take out the tea leaf filter basket 2, pours boiled water into the pot body 1 of the teapot, places tea leaves on the tea leaf filter basket 2, puts the tea leaf filter basket 2 into the pot body 1 to enable the outer rim 201 of the tea leaf filter basket 2 to be erected above the pot opening of the pot body 1, and covers the lid 4. At this time, the convex pins 3035 on the first connection lug 303 on the tea leaf filter basket bracket 3 are snapped in the pin holes 4012 on the second connection lug 401, and the lid 4 is at the locked position. The teapot is used to start to make tea. When the tea reaches strength or taste expected by the user, the tea can be directly poured out, and the user does not need to press the lid 4 with a hand; the tea leaf filter basket 2 is tightly locked at the mouth of the pot body 1 since the lid 4 has been at the locked position; and the tea leaf filter basket 2 will not fall off. This structure brings a brand-new use experience to the user.

When tea leaves need to be replaced, only the lid opening pressing plate 402 needs to be pressed with a hand; the convex pins 3035 on the first connection lug 303 on the tea leaf filter basket bracket 3 are separated from the pin holes 4012 on the second connection lug 401, and the lid 4 is opened; the user can conveniently lift up the tea leaf filter basket 2 by only lifting up the shank 202 of the tea leaf filter basket 2, and discard residues in the tea leaf filter basket 2; and the tea leaf filter basket is flushed and cleaned for next use.

The present disclosure has the advantages that 1. By means of providing the tea leaf filter basket bracket 3 between the pot opening of the pot body 1 and the tea leaf filter basket 2 and disposing the tea leaf filter basket 2 in the tea leaf filter basket bracket 3, the teapot can effectively reduce the colliding friction between the tea leaf filter basket 2 and the inner wall of the pot body 1 during placement to avoid damage to the pot body 1 and will not generate collision noise. 2. The silicone rubber ring 5 is embedded into the groove 304 formed between the large saddle 301 and the small boss 302 of the tea leaf filter basket bracket 3, and the silicone rubber ring 5 is in interference sealed fit with the inner side surface of the pot opening, so that the silicone rubber ring 5 can effectively prevent loss of heat of the tea in the pot. Moreover, the tea leaf filter basket bracket 3 can be tightly embedded into the mouth of the pot body 1 by means of the interference fit of the silicone rubber ring 5. During pouring of the tea, the tea leaf filter basket 2, the liquid 3, and the tea leaf filter basket bracket 4 will not fall off. The structure is simple and convenient to remove and clean. 3. The tea leaf filter basket bracket 3 is provided with the connection lugs pivoted with the lid 4, so that the lid 4 is fixed at the upper ends of the tea leaf filter basket bracket 3 and the tea leaf filter basket 2, and the structure is simple and practical. 4. The lid 4 is provided with the quick steam condensation ring 403 to reduce the backflow of the condensed water on the inner wall of the lid during lid opening.

The present disclosure can effectively filter the tea leaves to cause the tea water to flow out, so that the teapot is clean and sanitary and is convenient to use and stable in structure.

The invention claimed is:

1. A teapot, provided with a pot body (1), a tea leaf filter basket (2) in the pot body (1), and a lid (4) on the pot body (1), wherein a tea leaf filter basket bracket (3) is sleeved at a pot opening of the pot body (1) on an outer edge of the tea leaf filter basket (2); the tea leaf filter basket bracket (3) and an inner side surface of the pot opening of the pot body (1) are in interference fit; and the tea leaf filter basket bracket (3) is in pivoted connection with the lid (4);

wherein the tea leaf filter basket bracket (3) is a cylinder with opening in two ends; an upper end part of the tea leaf filter basket bracket is outwards flipped 90 degrees to form a circular large saddle (301); and an lower end part of the tea leaf filter basket bracket (3) is outwards flipped 90 degrees to form a circular small boss (302); the large saddle (301), the cylinder of the tea leaf basket bracket (3), and the small boss (302) form one circle groove (304); the groove (304) is internally sleeved with a silicone rubber ring (5); and the silicone rubber ring (5) is in interference fit with the inner side surface of the pot opening of the pot body (1);

wherein one end of a circumferential edge of the large saddle (301) extends to the outside to form a first connection lug (303), and the first connection lug (303) of an opened ring shape; and wherein the lid (4) is a circular flat plate; a lower end surface of the circular flat plate is provided with a circular-ring-type quick steam condensation ring (403); a circle center of the quick steam condensation ring (403) and a circle center of the lid (4) are concentric; a circumference of the circular flat plate of the lid (4) extends to the outside in a radial direction to form a strip-type lid opening pressing plate (402); and the edge of a side of a circular ring of the quick steam condensation ring (403) close to the lid opening pressing plate (402) is the highest, and is symmetrically gradually lowered towards two sides till a side opposite to the lid opening pressing plate (402) is the lowest, so that the quick steam condensation ring (403) is formed into a bevel edge circular ring.

2. The teapot according to claim 1, wherein a connection position of the lid (4) and the lid opening pressing plate (402) is provided with a second connection lug (401); the second connection lug (401) is provided with two parallel small plates; the small plates are provided with coaxial through holes; the first connection lug (303) is arranged between the two small plates to enable the axis of the opened ring to be coaxial with the through holes of the small plates; and a snap-in pillar (4011) passes through the opened ring and the through holes of the small plates along the axis to form intermittent fit connection.

3. The teapot according to claim 2, wherein the inner side of the opened ring of the first connection lug (303) is of an arc-shaped structure (3031); two ends of the upper part of the arc-shaped structure (3031) are provided with protruding parts (3032) that protrude into the arc; an opening (3033) is formed between the protruding parts (3032); and an accommodating space (3034) is provided below the opening.

4. The teapot according to claim 3, wherein an outer diameter of the snap-in pillar (4011) is greater than a distance between the two protruding parts (3032).

5. The teapot according to claim 4, wherein the opened ring of the first connection lug (303) is an elastic buckle.

6. The teapot according to claim 5, wherein two sides of the opened ring of the first connection lug (303) close to the protruding parts (3032) are provided with outwards convex pins (3035), and the axis of each convex pin (3035) is parallel to the axis of the accommodating space (3034).

7. The teapot according to claim 6, wherein pin holes (4012) are formed in the small plates of the second connection lug (401); and when the lid (4) is covered at the position on the pot opening of the pot body (1), the convex pins (3035) extend into the pin holes (4012).

* * * * *